(12) United States Patent
Kanchan (10) Patent No.: US 9,209,735 B2
(45) Date of Patent: Dec. 8, 2015

(54) CONTROL SYSTEM AND METHOD FOR AN ELECTRIC THREE-PHASE VARIABLE SPEED MOTOR

(71) Applicant: ABB Technology Ltd, Zurich (CH)

(72) Inventor: Rahul Kanchan, Vasteras (SE)

(73) Assignee: ABB Technology Ltd, Zurich (CH)

( * ) Notice: Subject to any disclaimer, the term of this patent is extended or adjusted under 35 U.S.C. 154(b) by 0 days.

(21) Appl. No.: 14/587,859

(22) Filed: Dec. 31, 2014

(65) Prior Publication Data

US 2015/0188474 A1 Jul. 2, 2015

(30) Foreign Application Priority Data

Jan. 2, 2014 (EP) ..................................... 14150005

(51) Int. Cl.
*H02P 21/14* (2006.01)
*H02P 21/00* (2006.01)

(52) U.S. Cl.
CPC ............ *H02P 21/14* (2013.01); *H02P 21/0089* (2013.01)

(58) Field of Classification Search
CPC ....... H02P 21/0089; H02P 6/18; H02P 21/00; H02P 21/0003; H02P 21/0032; H02P 21/0039; H02P 21/0092; H02P 21/146; H02P 27/00; H02P 29/02; H02P 29/021; H02P 6/08; H02P 21/14
USPC .................. 318/400.02, 400.33, 803, 400.01, 318/400.07, 400.32, 432, 434, 609, 610, 318/700, 798, 801
See application file for complete search history.

(56) References Cited

U.S. PATENT DOCUMENTS

| 7,348,756 | B2* | 3/2008 | Ma et al. ....................... 318/803 |
| 8,228,016 | B2* | 7/2012 | Gallegos-Lopez et al. ... 318/609 |
| 8,648,562 | B2* | 2/2014 | Lipo ............................. 318/814 |
| 8,779,702 | B2* | 7/2014 | Si et al. .................... 318/400.02 |
| 8,786,230 | B2* | 7/2014 | Lee et al. ................. 318/400.32 |
| 8,970,146 | B2* | 3/2015 | Pollock et al. ........... 318/400.02 |
| 8,994,304 | B2* | 3/2015 | Bae et al. ................. 318/400.02 |

(Continued)

FOREIGN PATENT DOCUMENTS

| EP | 0279415 A1 | 8/1988 |
| EP | 0790701 A2 | 8/1997 |
| EP | 2544362 A2 | 1/2013 |

(Continued)

OTHER PUBLICATIONS

European Search Report Application No. 14150005.8 Completed: Sep. 4, 2014; Mailing Date: Sep. 12, 2014 pp. 5.

*Primary Examiner* — Rita Leykin
(74) *Attorney, Agent, or Firm* — Whitmyer IP Group LLC (57) ABSTRACT

A control system for an electric three-phase variable speed motor includes an inverter for providing power to the motor and a control arrangement for controlling the inverter. The control arrangement includes a d and q axis currents determining module configured to repeatedly determine d and q axis currents based on detected currents of the motor. An MTPA control block repeatedly generates reference d and q axis currents based on the determined d and q axis currents and a ratio value such that the ratio of the reference d and q axis currents is equal to the ratio value, which is set to unity. A switching signal generation module repeatedly generates switching signals to control the inverter based on the reference d and q axis currents. A fine adjustment module calculates a magnitude of a current or power of the motor and determines an optimum compensation ratio value.

19 Claims, 5 Drawing Sheets

(56) References Cited

U.S. PATENT DOCUMENTS

| | | |
|---|---|---|
| 2004/0036434 A1 | 2/2004 | Chen et al. |
| 2006/0055363 A1 | 3/2006 | Patel et al. |
| 2013/0181642 A1 | 7/2013 | Khan et al. |
| 2013/0249449 A1 | 9/2013 | Uematsu et al. |

FOREIGN PATENT DOCUMENTS

| | | |
|---|---|---|
| JP | 2011147259 A | 7/2011 |
| KR | 20130041572 A | 4/2013 |
| WO | 2005002036 A2 | 1/2005 |
| WO | 2012118590 A2 | 9/2012 |

* cited by examiner

CONTROL SYSTEM AND METHOD FOR AN ELECTRIC THREE-PHASE VARIABLE SPEED MOTOR

FIELD OF THE INVENTION

The technical field is generally directed to electric three-phase variable speed motors and to scalar based control thereof.

BACKGROUND OF THE INVENTION

Control arrangements for induction motor drives may comprise those, which implement constant V/f control in open loop mode. Such control arrangements may potentially operate the motor drives at enhanced efficiency, by incorporating MTPA (maximum torque per ampere) control in scalar mode. The MTPA control is a model based approach using current angle control. Typically, the stator currents of the motor are resolved into equivalent d and q axis currents and then the d axis current reference is controlled which maximizes motor efficiency.

Figure 1:
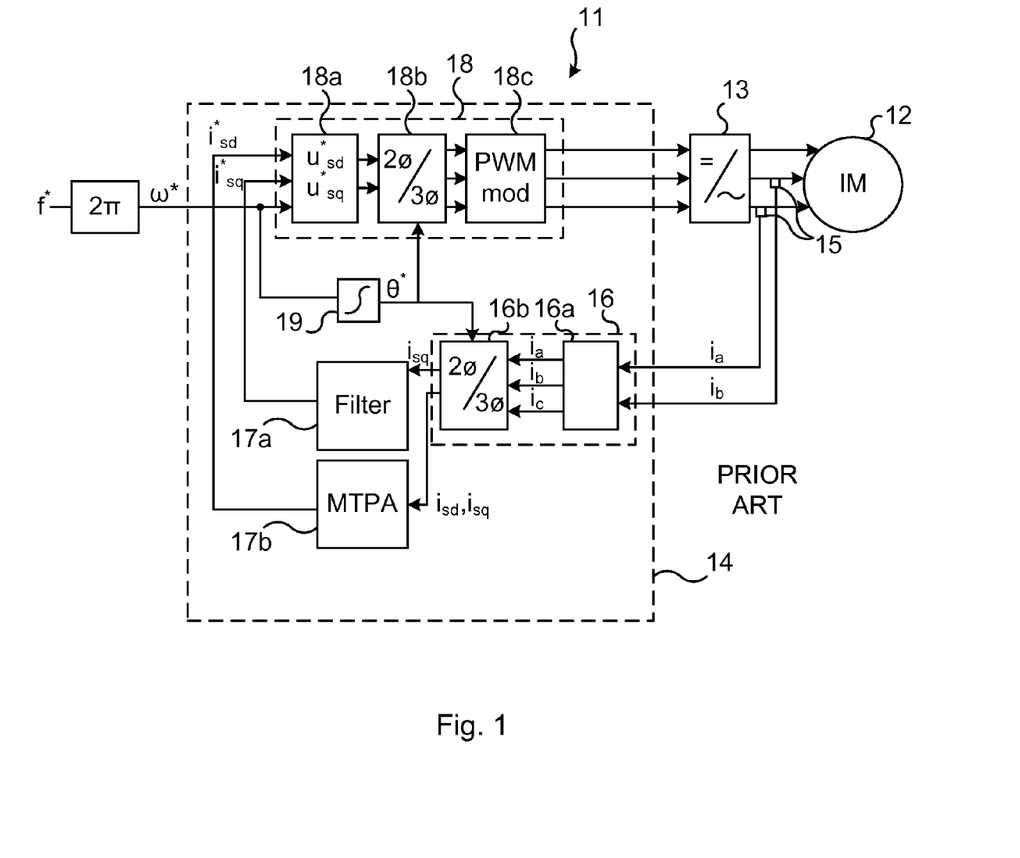
FIG. 1 is a schematic diagram of a control system for an electric three-phase variable speed motor according to prior art.

FIG. 1 is a schematic diagram of a control system 11 for an electric three-phase variable speed motor 12 comprising such a scalar based control arrangement 14 for controlling an inverter 13, which provides power to the motor 12. The control system comprises also current sensors 15 configured to detect currents of the motor. The control arrangement comprises a d and q axis currents determining module 16 configured to determine the d and q axis currents $i_{sd}$, $i_{sq}$ based on the detected currents and a reference phase $\theta^*$, a low pass filter block 17a, an MTPA control block 17b, and a switching signal generation module 18.

The current sensors 15 may be configured to detect two $i_a$, $i_b$ of the three currents $i_a$, $i_b$, $i_c$ of the three-phase motor 12. The d and q axis currents determining module 16 may in such instance comprise a first current determining block 16a configured to determine the three currents $i_a$, $i_b$, $i_c$ based on the detected currents $i_a$, $i_b$ and a second current determining block 16b configured to determine the d and q axis currents $i_{sd}$, $i_{sq}$ based on the three currents $i_a$, $i_b$, $i_c$ and the reference phase $\theta^*$.

The q axis current $i_{sq}$ is input to the low pass filter block 17a from the d and q axis currents determining module 16 and is low pass filtered for control stability in the low pass filter block 17a to form the reference q axis current $i^*_{sq}$, which is input to the switching signal generation module 18.

The d and q axis currents $i_{sd}$, $i_{sq}$ are input to the MTPA control block 18, which is configured to generate a reference d axis current $i^*_{sd}$ based on the determined d and q axis currents $i_{sd}$, $i_{sq}$ and a ratio value such that the ratio of the d and q axis currents is equal to the ratio value, wherein the ratio value is set to unity.

The switching signal generation module 18 is configured to generate PWM modulated switching signals to control the inverter 13 based on the reference d and q axis currents $i^*_{sd}$, $i^*_{sq}$. The switching signal generation module 18 comprises a first block 18a, to which the reference d and q axis currents $i^*_{sd}$, $i^*_{sq}$ and a reference speed $\omega^*$ are input. The first block 18a is configured to determine the reference d and q axis voltages $u^*_{sd}$, $u^*_{sq}$ from reference d and q axis currents $i^*_{sd}$, $i^*_{sq}$. These voltages are input to a second block 18b, which is configured to repeatedly generate voltage vectors $u^*_{sa}$, $u^*_{sb}$, $u^*_{sc}$ based on the d and q axis voltages $u^*_{sd}$, $u^*_{sq}$ and a reference phase $\theta^*$. The voltage vectors are PWM modulated in a third block 18c to form PWM modulated switching signals $S_a$, $S_b$, $S_c$, and the PWM modulated switching signals $S_a$, $S_b$, $S_c$ are input to the inverter 13.

The second current determining block 16b of the d and q axis currents determining module 16 and the second block 18b of the switching signal generation module 18 may be implemented using dq-abc transformations. An integrator block 19 is configured to integrate the reference speed $\omega^*=2\pi f^*$, thereby forming a reference phase $\theta^*$ by continuously integrating $\omega^*$, which is input to the second current determining block 16b of the d and q axis currents determining module 16 and the second block 18b of the switching signal generation module 18.

The model based MTPA control approach disclosed above works well if the induction motor magnetization flux is assumed linear function of magnetizing current (constant magnetizing inductance). In reality, this is not true due to the saturation characteristics of motor magnetic flux. At partial speeds and/or low flux levels, the performance is optimum since the motor flux is not saturated at this operation condition. But at nominal speed or when the motor voltage is near the nominal value, due to magnetizing inductance saturation effects, the MTPA control approach as described above does not lead to optimum current operation.

SUMMARY OF THE INVENTION

It is an aim of this disclosure to present a control system and a control method for an electric three-phase variable speed motor, which are based on the MTPA control approach, but which can maintain optimum current operation irrespective of operating speed or motor voltage.

A first aspect refers to a control system for an electric three-phase variable speed motor having a stator and rotor, wherein the control system comprises an inverter for providing power to the electric motor, a scalar based control arrangement for controlling the inverter, and current sensors for measuring motor currents. The control arrangement comprises a d and q axis currents determining module, a filter block, an MTPA control block, a switching signal generation module, and a fine adjustment module.

The current sensors are configured to repeatedly detect currents of the motor and the d and q axis currents determining module is configured to repeatedly determine d and q axis currents based on the detected currents. The filter block is configured to repeatedly filter the determined q axis current, thereby generating a reference q axis current, and the MTPA control block is configured to repeatedly generate a reference d axis current based on the d and q axis currents and a ratio value such that the ratio of the d and q axis currents is equal to the ratio value, wherein the ratio value is unity. The switching signal generation module is configured to repeatedly generate switching signals to control the inverter based on the reference d and q axis currents.

At some instant, e.g. when a particular operational condition is met, the fine adjustment module is configured to calculate a magnitude of a current or power of the motor (e.g. based on sensed motor parameters) and to determine a compensation ratio value based on the magnitude of a current or power of the motor, which compensation ratio value is added to the ratio value to form an adjusted ratio value, which adjusted ratio value when being used by the MTPA control block would cause the motor to operate in a condition wherein the magnitude of a current or power of the motor is minimized.

Finally, the MTPA control block is configured to repeatedly generate an adjusted reference d axis current based on the d and q axis currents and the adjusted ratio value such that the ratio of the d and q axis currents is equal to the adjusted ratio value, and the switching signal generation module is configured to repeatedly generate switching signals to control the inverter based on the adjusted reference d axis current and the reference q axis current.

Hereby, a control system is obtained, which can use the scalar MTPA control approach at unsaturated conditions, and add the proposed fine adjustment when needed, e.g. at saturated conditions or at conditions close to saturation. It shall be appreciated that the control system is particularly suitable for situations with no prior knowledge of the machine parameters of the electric three-phase variable speed motor. The fine adjustment even if applied in unsaturated conditions (e.g. condition at no or partial load and/or at lower speed operation), may not result in any improvement in MTPA control and thus may not be required.

The fine adjustment module may be configured to determine the optimum compensation ratio value in an iterative algorithm based on the perturb and observe principle. That is, a step disturbance signal is injected into the controlling variable and the response, i.e. sign and amplitude, in the controlled variable is monitored. The compensation signal is generated such that the controlled variable is moved to the optimum point where the amplitude of controlled variable is at its minimum (or maximum). This type of control is suitable for the systems which inherently show a minimum point (or maximum point) as the controlling variable is changed across its span. The MTPA based control is a perfect match for such control since the current variation (or efficiency variation) shows a minimum point for variation in the motor flux.

In one embodiment, the fine adjustment module may be configured to determine the optimum compensation ratio value by means of performing the following algorithm:
(i) switching on and switching off a perturbation signal, which is added to the ratio value, to form a signal on which the MTPA control block is configured to base a repeatedly generated reference d axis current, on which in turn the switching signal generation module is configured to base repeatedly generated switching signals to control the inverter,
(ii) determining a difference between a magnitude of a current or power of the motor (e.g. determined based on sensed motor parameters) when the perturbation signal is switched on and a magnitude of a current or power of the motor when the perturbation signal is switched off, and
(iii) incrementally adding a compensation ratio value to the signal on which the MTPA control block is configured to base a repeatedly generated reference d axis current, wherein the compensation ratio value is determined dependent on the difference, wherein (i)-(iii) are repeated until the difference falls short of a threshold level.

The fine adjustment module may configured to switch off the perturbation signal when the difference falls short of a threshold level and the optimum compensation ratio value is obtained as the incrementally added compensation ratio value.

A second aspect refers to a control system for an electric three-phase variable speed motor having a stator and rotor, the control system comprising an inverter for providing power to the electric motor, a scalar based control arrangement for controlling the inverter, and current sensors for measuring currents in the motor. The control arrangement comprises a d and q axis currents determining module, a filter block, an MTPA control block, a switching signal generation module, and a fine adjustment module.

The current sensors are configured to repeatedly detect currents of the motor, the d and q axis currents determining module is configured to repeatedly determine d and q axis currents based on the detected currents; the filter block is configured to repeatedly filter the determined q axis current, thereby generating a reference q axis current, and the MTPA control block is configured to repeatedly generate a reference d axis current based on the d and q axis currents and a ratio value such that the ratio of the d and q axis currents is equal to the ratio value, wherein the ratio value is unity. The switching signal generation module is configured to repeatedly generate switching signals to control the inverter based on the reference d and q axis currents.

The fine adjustment module is configured to calculate the magnitude of a current or power (e.g. based on sensed motor parameters) of the motor and to determine an optimum compensation current based on the calculated magnitude of a current or power of the motor. The optimum compensation current is added to the reference d axis current to form an adjusted reference d axis current, which adjusted reference d axis current when being used by the switching signal generation module would cause the motor to operate in a condition wherein the magnitude of a current or power of the motor is minimized, wherein the switching signal generation module is configured to repeatedly generate switching signals to control the inverter based on the adjusted reference d axis current and the reference q axis current.

In this aspect, the ratio value, which is used by the MTPA control module, is not fine tuned, but instead a reference current output from the MTPA control block is fine tuned by means of adding a compensation current to the reference d axis current output from the MTPA block, and to feed the switching signal generation module with this sum as the reference d axis current.

The fine adjustment module may be configured to determine the optimum compensation current in an iterative algorithm based on the perturb and observe principle in a similar manner as disclosed with respect to the first aspect.

In one embodiment, the fine adjustment module is configured to determine the optimum compensation current by means of performing the following algorithm while the output reference d axis current from the MTPA control block is held latched:
(i) switching on and switching off a perturbation current signal, which is added to the reference d axis current, to form a signal on which the switching signal generation module is configured to base repeatedly generated switching signals to control the inverter,
(ii) determining a difference between a magnitude of a current or power of the motor (e.g. determined based on sensed motor parameters) when the perturbation signal is switched on and a magnitude of a current or power of the motor when the perturbation signal is switched off, and
(iii) incrementally adding a compensation current to the signal on which switching signal generation module is configured to base repeatedly generated switching signals to control the inverter, wherein the compensation current is determined dependent on the difference, wherein (i)-(iii) are repeated until the difference falls short of a threshold level.

The fine adjustment module may be configured to switch off the perturbation signal when the difference falls short of a threshold level and the optimum compensation current is obtained as the incrementally added compensation current.

The magnitude of a current or power of the motor may be a magnitude of a current of the motor and is calculated as the mean square root of the determined d and q axis currents or from the detected currents.

Alternatively, the magnitude of a current or power of the motor may be a magnitude of an estimated power of the motor and may be calculated based on reference voltages calculated based on the reference d and q axis currents and (ii) the determined d and q axis currents or the detected currents.

Yet alternatively, the magnitude of a current or power of the motor is a magnitude of a power of the motor and is calculated based on detected voltages and currents of the motor.

The control system may be configured to power the stator of an induction motor, and the current sensors may be configured to repeatedly detect stator currents of the motor.

The fine adjustment module may be configured to be operated at saturated flux operation conditions.

The fine adjusting may be reset or cancelled when a changed operating condition of the motor, e.g. due to a transient step in torque and/or speed of the motor, is detected, and the fine adjusting may be performed or activated again when a steady state of the motor has been detected.

A third aspect refers to a control method for an electric three-phase variable speed motor having a stator and rotor, wherein the control method comprises the following steps: (i) receiving repeatedly detected currents of the motor; (ii) repeatedly determining d and q axis currents based on the received currents; (iii) repeatedly filtering the determined q axis current, thereby generating a reference q axis current; (iv) applying an MTPA control scheme in which a reference d axis current is repeatedly generated based on the determined d and q axis currents and a ratio value such that the ratio of the d and q axis currents is equal to the ratio value, wherein the ratio value is unity; (v) repeatedly generating switching signals to control an inverter based on the reference d and q axis currents wherein the inverter is operable to power the motor; (vi) fine adjusting the MTPA control scheme by means of calculating a magnitude of a current or power (e.g. based on sensed motor parameters) of the motor and determining an optimum compensation ratio value based on the calculated magnitude of a current or power of the motor, which optimum compensation ratio value is added to the ratio value to form an adjusted ratio value, which when being used in the MTPA control scheme would cause the motor to operate in a condition wherein the magnitude of a current or power of the motor is minimized; (vii) applying the MTPA (maximum torque per ampere) control scheme for repeatedly generating an adjusted reference d axis current based on the determined d and q axis currents and the adjusted ratio value such that the ratio of the d and q axis currents is equal to the adjusted ratio value; and (viii) repeatedly generating switching signals to control the inverter based on the adjusted reference d axis current and the reference q axis current.

A fourth aspect refers to a control method for an electric three-phase variable speed motor having a stator and rotor, wherein the control method comprises the following steps: (i) receiving repeatedly detected currents of the motor; (ii) repeatedly determining d and q axis currents based on the detected currents; (iii) repeatedly filtering the determined q axis current, thereby generating a reference q axis current; (iv) applying an MTPA control scheme in which a reference d axis current is repeatedly generated based on the determined d and q axis currents and a ratio value such that the ratio of the d and q axis currents is equal to the ratio value, wherein the ratio value is unity; (v) repeatedly generating switching signals to control an inverter based on the reference d and q axis currents wherein the inverter is operable to power the motor; (vi) fine adjusting the MTPA control scheme by means of calculating the magnitude of a current or power of the motor (e.g. based on sensed motor parameters) and determining an optimum compensation current based on the calculated magnitude of a current or power of the motor, which optimum compensation current is added to the reference d axis current to form an adjusted reference d axis current, which when being used for generating the switching signals would cause the motor to operate in a condition wherein the magnitude of a current or power of the motor is minimized; and (vi) repeatedly generating switching signals to control the inverter based on the adjusted reference d axis current and the reference q axis current.

A fifth aspect refers a computer program comprising computer program code which, when run on a digital controller, causes the digital controller to perform the method of any of the third and fourth aspects.

The third to fifth aspects may be modified to disclose any of the additional actions or features as disclosed with reference to the first and second aspects.

A sixth aspect refers to a computer program product comprising the computer program of the fifth aspect and computer readable means, on which the computer program is stored.

The proposed MTPA based control approach with fine adjustment can easily adapted to existing scalar control. In vast majority of applications, induction motor drives are used in less dynamic applications such as heating, ventilation and air conditioning (HVAC), or in pumping applications. The drives are often operated in scalar control mode with fixed magnetization level which is even left to its rated values wherein the efficiency of the drive is not optimal. In such applications, the proposed MTPA based control approach with fine adjustment will enable to operate these drives at minimum currents or powers, thus increasing the efficiency of the overall drive system.

Further, the proposed MTPA based control approach can be designed not to cause torque oscillations which are reflected into the motor current and motor speed, not even if slip compensation is active in the scalar control mode.

Large ripple in the motor current may create implementation issues if the current ripple is larger than the step change in the current resulting from disturbance signal injection, but can be handled by filtering detected motor currents and by allowing sufficient time to pass to enable the motor to stabilize at the adjusted operating point.

Further characteristics and advantages will be evident from the detailed description of embodiments given hereinafter, and the accompanying FIGS. 1-3, which are given by way of illustration only.

BRIEF DESCRIPTION OF THE DRAWINGS

FIG. 2a is a schematic diagram of a control system for an electric three-phase variable speed motor according to an embodiment and FIG. 2b is a schematic diagram of a portion of the control system of FIG. 2a.

FIG. 3a is a schematic diagram of a control system for an electric three-phase variable speed motor according to an embodiment and FIG. 3b is a schematic diagram of a portion of the control system of FIG. 3a.

Like numerals refer to like parts throughout the drawings.

DETAILED DESCRIPTION OF THE INVENTION

Figure 2A:
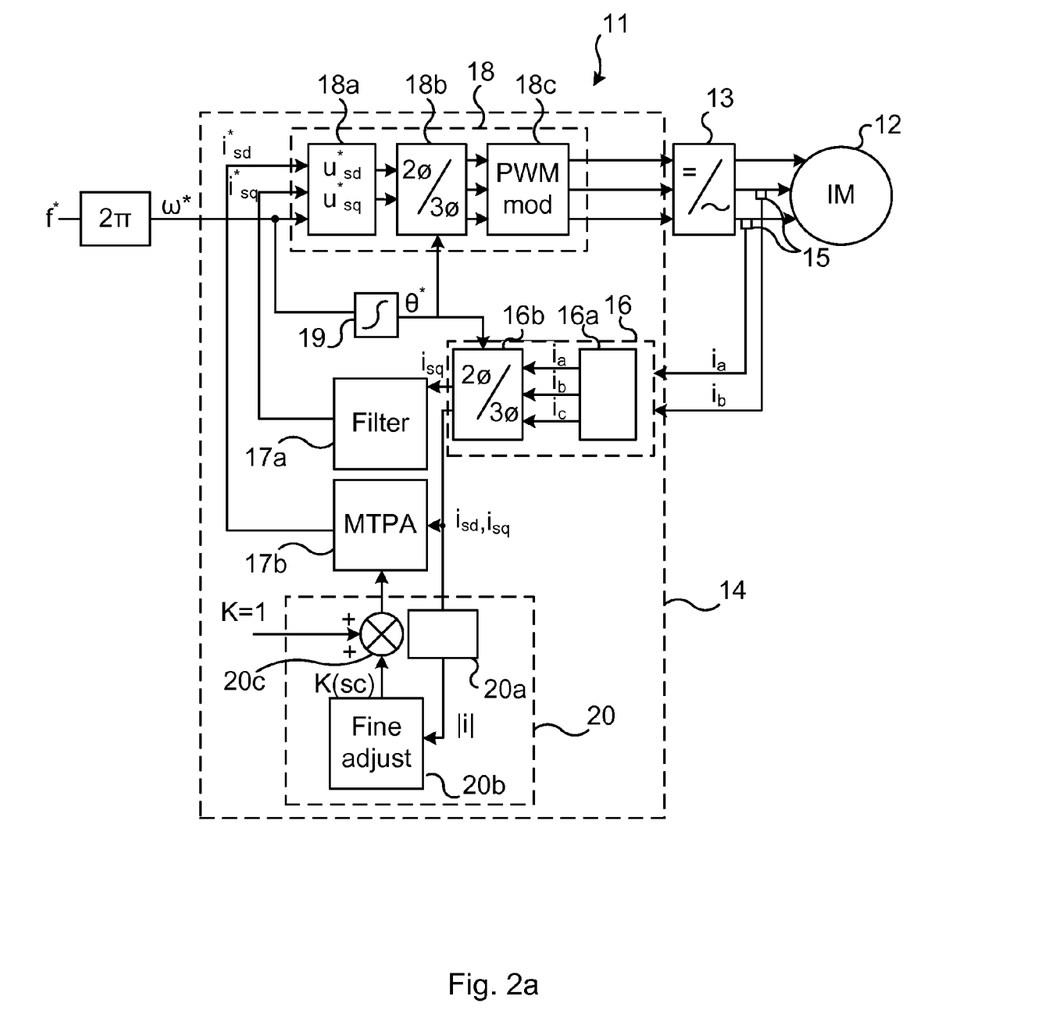

FIG. 2a is a schematic diagram of a control system 11 for an electric three-phase variable speed motor 12 according to an embodiment. The electric three-phase variable speed motor 12 may be an induction motor as shown in FIG. 2a. The control system 11 comprises an inverter 13 for providing power to the electric motor 12, a scalar based control arrangement 14 for controlling the inverter 13, and current sensors 15 for measuring currents in the motor 12. The inverter 13 may be connected to the stator of the motor 12.

The control arrangement 14 comprises a d and q axis currents determining module 16, a filter block 17a, an MTPA (maximum torque per ampere) control block 17b, a switching signal generation module 18, and a fine adjustment module 20.

The current sensors 15 are configured to repeatedly detect currents, preferably stator currents, of the electric motor 12 and to forward the detected currents to the d and q axis currents determining module 16.

The d and q axis currents determining module 16 is configured to repeatedly determine d and q axis currents $i_{sd}$, $i_{sq}$ based on the detected currents and a reference phase $\theta^*$. If the current sensors 15 are configured to detect two $i_a$, $i_b$ of the three currents $i_a$, $i_b$ $i_c$ of the three-phase motor 12, the d and q axis currents determining module 16 may comprise a first current determining block 16a configured to determine the three currents $i_a$, $i_b$ $i_c$ based on the detected currents $i_a$, $i_b$ and a second current determining block 16b configured to determine the d and q axis currents $i_{sd}$, $i_{sq}$ based on the three currents $i_a$, $i_b$ $i_c$ and the reference phase $\theta^*$.

The q axis current $i_{sq}$ is input to the low pass filter block 17a from the d and q axis currents determining module 16 and is low pass filtered in the low pass filter block 17a to form the reference q axis current $i^*_{sq}$, which is input to the switching signal generation module 18.

The d and q axis currents $i_{sd}$, $i_{sq}$ is input to the MTPA control block 18 from the d and q axis currents determining module 16 and is configured to generate a reference d axis current $i^*_{sd}$ based on the determined d and q axis currents $i_{sd}$, $i_{sq}$ and a ratio value K such that the ratio of the d and q axis currents is equal to the ratio value, wherein the ratio value is set to unity, i.e. K=1. This is the MTPA control approach neglecting the saturation behaviour of motor magnetizing inductance.

The switching signal generation module 18 is configured to generate PWM modulated switching signals to control the inverter 13 based on the reference d and q axis currents $i^*_{sd}$, $i^*_{sq}$. The switching signal generation module 18 comprises a first block 18a, to which the reference d and q axis currents $i^*_{sd}$, $i^*_{sq}$ and a reference frequency $\omega^*=2\pi f^*$ are input. The block 18a is configured to convert the reference d and q axis currents $i^*_{sd}$, $i^*_{sq}$ to reference d and q axis voltages $u^*_{sd}$, $u^*_{sq}$. These voltages are input to a second block 18b, which is configured to repeatedly generate voltage vectors $u^*_{sa}$, $u^*_{sb}$, $u^*_{sc}$ based on the d and q axis voltages $u^*_{sd}$, $u^*_{sq}$ and the reference phase $\theta^*$. The voltage vectors are PWM modulated in a third block 18c to form PWM modulated switching signals $S_a$, $S_b$, $S_c$, and the PWM modulated switching signals $S_a$, $S_b$, $S_c$ are input to the inverter 13.

The second current determining block 16b of the d and q axis currents determining module 16 and the second block 18b of the switching signal generation module 18 may be implemented using dq0 transformations. An integrator block 19 is configured to integrate the reference speed $\omega^*_s=2\pi f^*$, thereby forming a reference phase $\theta^*$, which is input to the second current determining block 16b of the d and q axis currents determining module 16 and the second block 18b of the switching signal generation module 18.

At some operational condition, e.g. a saturated or near saturated flux operation condition, the fine adjustment module 20 is activated. The fine adjustment module comprises a block 20a for calculating a magnitude of a current |Ii| or power P* of the motor, a fine adjustment block 20b for determining an optimum compensation ratio value K(sc), and a block 20c for adding the optimum compensation ratio value K(sc) to the ratio value K to form an adjusted ratio value K+K(sc)=1+K(sc), which when being used by the MTPA control module 17 would cause the motor 12 to operate in a condition wherein a magnitude of a current |Ii| or power P* of the motor is minimized. The adjusted ratio value K+K(sc)=1+K(sc) is then input to the MTPA control block 17b (instead of K=1).

In response thereto, the MTPA control block 17b is configured to repeatedly generate an adjusted reference d axis currents $i^*_{sd}(adj)$ based on the d and q axis currents $i_{sd}$, $i_{sq}$ and the adjusted ratio value 1+K(sc) such that the ratio of the d and q axis currents $i^*_{sd}$, $i^*_{sq}$ is equal to the adjusted ratio value 1+K(sc) and the switching signal generation module 18 is configured to repeatedly generate switching signals to control the inverter 13 based on the adjusted reference d current $i^*_{sd}(adj)$ and the reference q axis current $i^*_{sq}$.

The magnitude of a current |Ii| or power P* of the motor 12 may be a magnitude of the current |Ii| calculated as the mean square root of the determined d and q axis currents $i_{sd}$, $i_{sq}$ as illustrated in FIG. 2a.

Alternatively, the magnitude of a current Iii or power P* is a magnitude of an estimated power P* of the motor 12 and is calculated based on (a) reference voltages calculated based on the reference d and q axis currents ($i^*_{sd}$, $i^*_{sq}$) e.g. by the first block 18a of the switching signal generation module 18, and (b) the determined d and q axis currents ($i_{sd}$, $i_{sq}$) or the detected currents ($i_a$, $i_b$).

Yet alternatively, the magnitude of a current Iii or power P* is a magnitude of a power of the motor 12 and is calculated based on detected voltages and currents of the motor 12.

In case a power is used instead, the block 20a is modified and may have further and/or different inputs in order to calculate a power of the motor in accordance with the above.

The fine adjustment module 20 may be configured to determine the optimum compensation ratio value K(sc) in an iterative algorithm based on the perturb and observe principle. This will be described below with reference to FIG. 2b in the case wherein the magnitude of the current is to be minimized. After smaller modifications of the block 20a and its inputs, the scheme would work similarly for the optimization of the power.

Figure 2B:
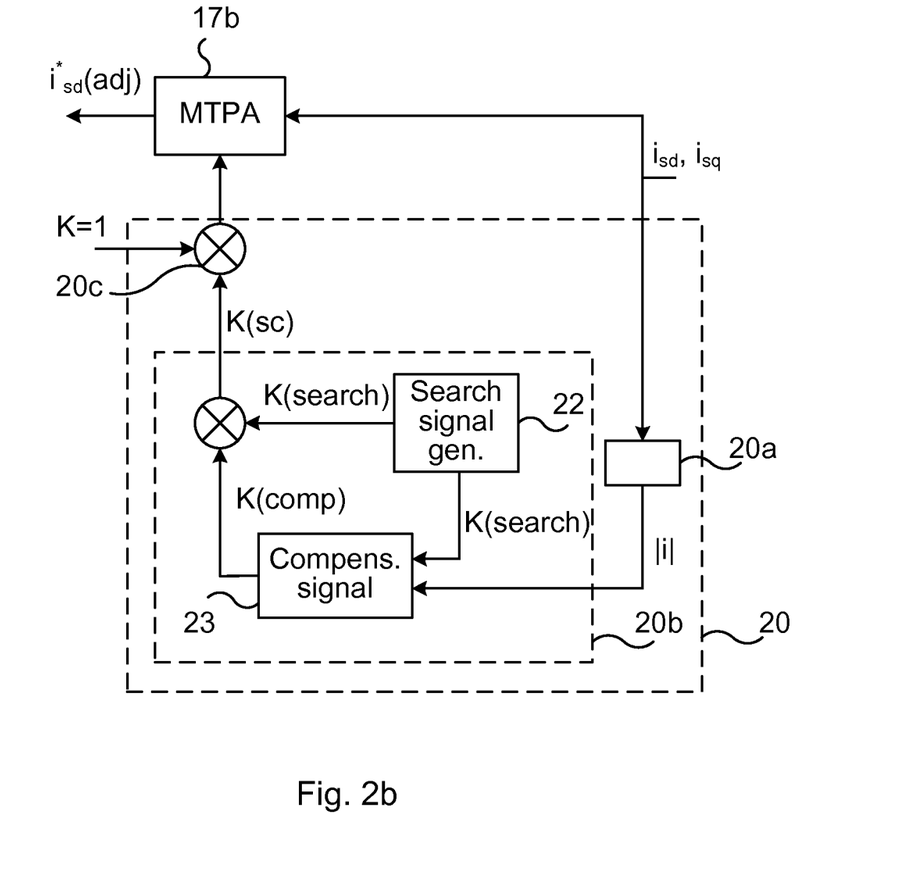

FIG. 2b is a schematic diagram of a portion of the control system of FIG. 2a, wherein the fine adjustment module 20 is shown in greater detail. The fine adjustment block 20b may comprise a search signal generation block 22 and a compensation signal generation block 23.

When the fine adjustment module 20 is activated, the search signal generation block 22 generates a perturbation or search signal K(search). The block 20c adds the search signal K(search) to the original ratio value K to form a perturbed ratio value of K+K(search), which is input to the MTPA control block 17b.

The MTPA control block 17b generates a perturbed reference d axis current based on the determined d and q axis currents $i_{sd}$, $i_{sq}$ and the perturbed ratio value K+K(search) such that the ratio of the d and q axis currents is equal to the perturbed ratio value K+K(search). The switching signal generation module 18 generates switching signals to control the inverter 13 based on the perturbed reference d and q axis currents. The current 15 measures the resulting currents of the motor and the d and q axis currents determining module 16 determines d and q axis currents based on the measured resulting currents and output these to the MTPA control block 17b and the block 20a of the fine adjustment module 20, which calculates from these the magnitude of the current Iii of the motor. The calculated magnitude is input to the compensation signal generation block 23, which determines the difference between the calculated magnitudes of the current |Ii| of the motor when the search signal K(search) is switch on and when it is switched off. Based on the difference, a compensation ratio value K(comp) is output from compensation signal generation block 23 to be added to the ratio value K at 20c via an adder that adds the search signal K(search) and the compensation ratio value K(comp).

The above procedure is repeated until convergence is achieved, i.e. until the difference falls low of a threshold level.

The search signal generation block 22 outputs a search signal K(search) which thus is alternately switched off and switched on, e.g. in the form of a square wave signal.

For each switching on and switching off, e.g. each period of the square wave signal, the compensation signal generation block 23 compares the difference between the calculated magnitude of the current Iii of the motor when the search signal K(search) is switched on and when it is switched off, and determines a compensation ratio value K(comp) which is incrementally or accumulatively added to the output.

The compensation value K(comp) may have a constant magnitude or may be dependent on the difference between the calculated magnitude of the current Iii of the motor when the search signal K(search) is switched on and when it is switched off. The latter option results in the faster convergence speed when the operating point is further away from optimal point.

In this manner the ratio value that is input to the MTPA control block 17b is the sum of K and K(sc) wherein K(sc) is the sum of the incrementally added compensation ratio value K(comp) and the search signal K(search). It is assumed that the search signal K(Search) is small such that typically a number of iterations are required to achieve convergence.

When the difference falls short of the threshold level, the search signal K(Search) is switched off, and the resulting compensation ratio value K(comp) will be equal to K(sc) and is thus the optimum compensation ratio value which is added to the ratio value K (K=1) to form the adjusted ratio value.

Once the adjusted ratio value is obtained, this is used in the MTPA control block 17b for the control of the inverter 13 until it can be expected or until it is measured that the operation condition has changed is some manner, e.g. until the speed or motor load torque is changed.

When an operating point is changed (transient step in torque and/or speed), the optimum compensation ratio value K(sc) is reset to default, e.g. zero, and the transient state is continued using the default value of K, i.e. K=1. After the steady state is reached, the above search based compensation algorithm is initiated to determine a new value of optimum compensation ratio value K(sc).

Figure 3A:
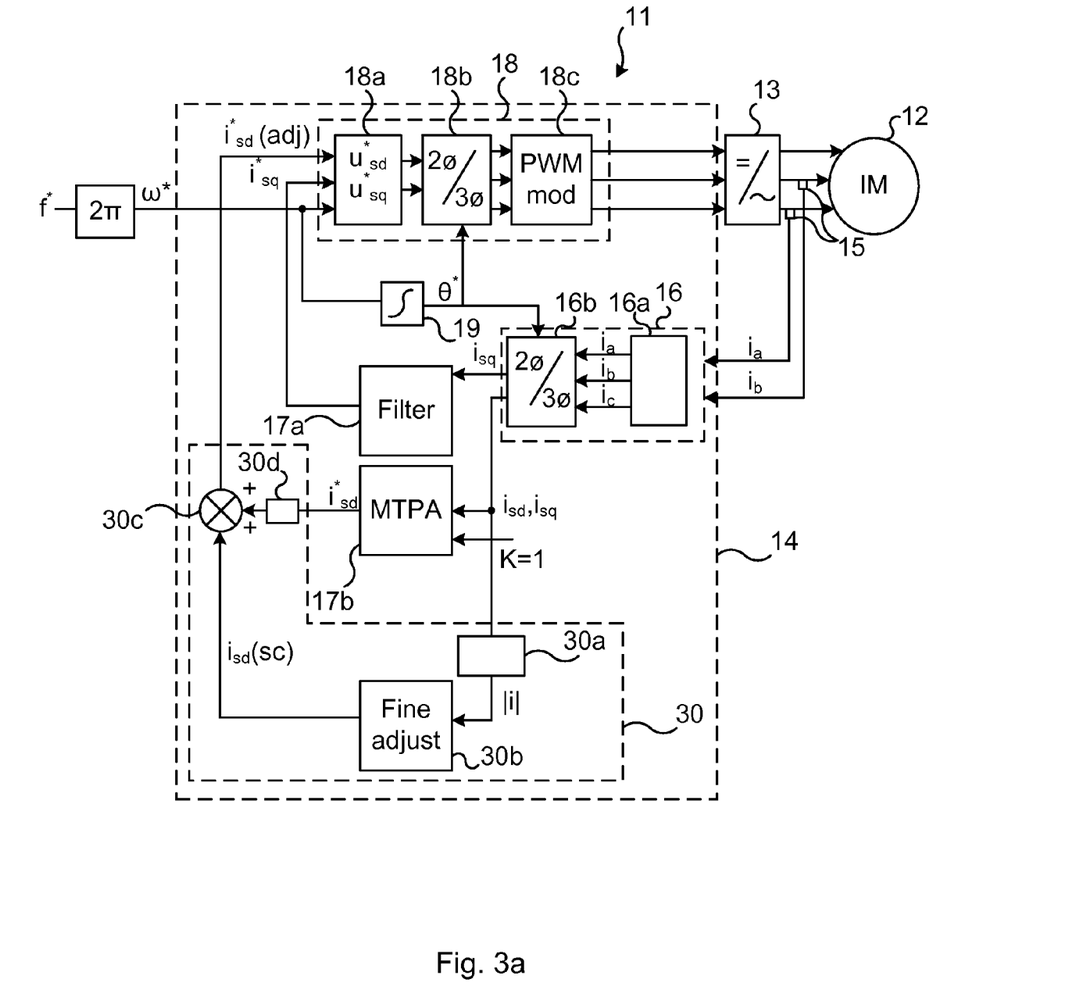

FIG. 3a is a schematic diagram of a control system for an electric three-phase variable speed motor according to an embodiment. The embodiment of FIG. 3a differs from the embodiment of FIG. 2a with respect to the following. The fine adjustment module, here denoted 30 comprises a block 30a for calculating a magnitude of a current or power of the motor, a fine adjustment block 30b for determining an optimum compensation current $i_{sd}$(sc), and a block 30c for adding the optimum compensation current $i_{sd}$(sc) to the reference d axis current to form an adjusted reference d axis currents i*$_{sd}$(adj), which when being used as the reference d axis current by the switching signal generation module 18 would cause the motor 12 to operate in a condition wherein the magnitude of a current Iii or power P* of the motor is minimized. The adjusted reference d axis currents i*$_{sd}$(adj) is output to the switching signal generation module 18 (instead of the output i*$_{sd}$ from the MTPA control block).

The switching signal generation module 18 is configured to repeatedly generate switching signals to control the inverter 13 based on the adjusted reference d current i*$_{sd}$(adj) and the reference q axis current i*$_{sq}$.

It shall be appreciated that a latch 30d is provided to hold the output i*$_{sd}$ from the MTPA control block 17b constant while the fine adjustment module 30 determines the optimum compensation current $i_{sd}$(sc).

Figure 3B:
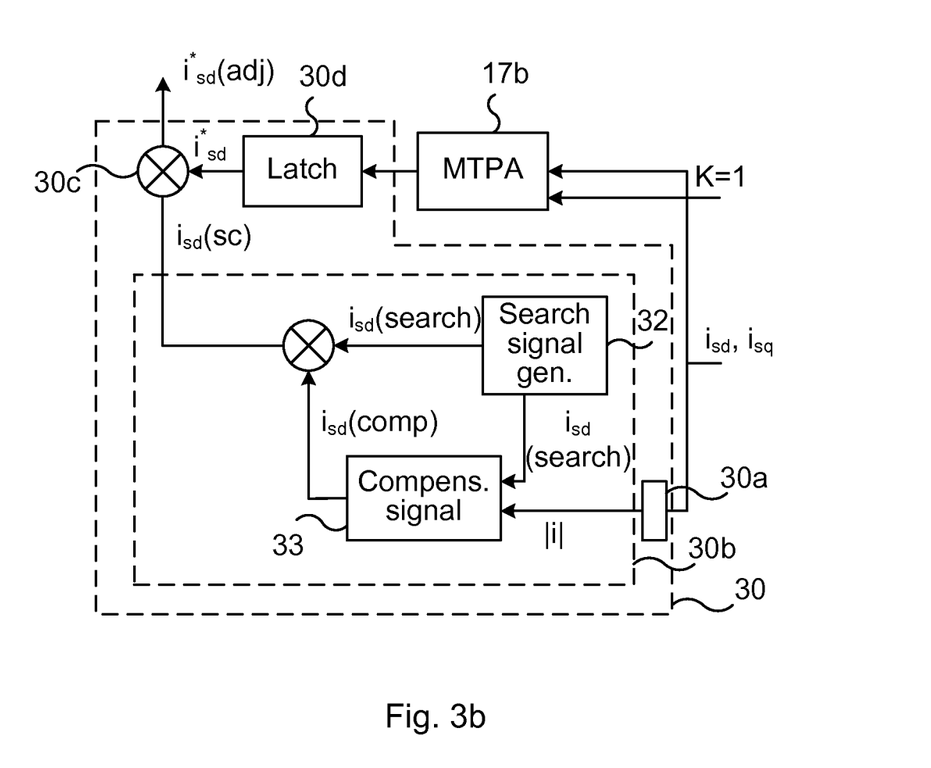

FIG. 3b is a schematic diagram of a portion of the control system of FIG. 3a, wherein the fine adjustment module 30 is shown in greater detail. The fine adjustment block 30b may comprise a search signal generation block 32 and a compensation signal generation block 33. The fine adjustment module 30 may configured to determine the optimum compensation current in an iterative algorithm based on the perturb and observe principle in a similar manner as has been described in detail with reference to FIG. 2b.

However, the output i*$_{sd}$ from the MTPA control block 17b is held constant by the latch 30d during the iteration procedure to find the optimum compensation current. Otherwise the MTPA control block 17b, if left in operation, will try to counter balance the effect from additional reference signal inputs from the fine adjustment module 30.

A perturbation current $i_{sd}$(search) and a compensation current $i_{sd}$(comp) as indicated in FIG. 2b correspond to the perturbation ratio value K(search) and the compensation ratio value K(comp) as disclosed with reference to FIG. 2b.

The fine adjustment module 30 is thus configured to determine the optimum compensation current $i_{sd}$(comp) by means of performing the following algorithm while the output reference d axis current from the MTPA control block 17b is held latched by the latch 30d.

Step 1: A perturbation or search current signal $i_{sd}$(search), which is switched on and switched off, is output from the search signal generation block 32 and is added to the reference d axis current i*$_{sd}$ at adder 30c to form a signal on which the switching signal generation module 18 is configured to base repeatedly generated switching signals to control the inverter 13.

Step 2: A magnitude of the current Iii of the motor 12 when the search signal $i_{sd}$(search) is switched on and when the perturbation signal $i_{sd}$(search) is switched off is calculated by the block 30a.

Step 3: A difference between a magnitude of the current Iii of the motor 12 when the search signal $i_{sd}$(search) is switched on and a magnitude of the current Iii of the motor when the perturbation signal $i_{sd}$(search) is switched off is determined in the compensation signal generation block 33.

Step 4: A compensation current is $I_{sd}$(comp) determined dependent on the above difference and is added to the previously determined compensation current, if any. The compensation value K(comp) may have a constant magnitude or may be dependent on the difference between the calculated magnitude of the current Iii of the motor when the search signal K(search) is switched on and when it is switched off. The latter option results in the faster convergence speed when the operating point is further away from optimal point.

Step 5: The incrementally or accumulatively added compensation current $I_{sd}$(comp) is added to the signal, on which switching signal generation module 18 is configured to base repeatedly generated switching signals to control the inverter 13, or more precisely first added to the search signal $i_{sd}$(search) via a first adder, and then added to the reference d axis current i*$_{sd}$ by the adder 30c.

Steps 1-5 are repeated until the difference falls short of a threshold level, at which point the signal generation block 32 switches off the perturbation signal and the optimum compensation current $i_{sd}(sc)$ is obtained as the incrementally added compensation current, which is added to the reference d axis current $i^*_{sd}$ by the adder 30c to form the adjusted reference d axis current $i^*_{sd}(adj)$, which when being used by the switching signal generation module 18 would cause the motor 12 to operate in a condition wherein the magnitude of a current |i| or power P* of the motor is minimized.

Although the signal injection and compensation schemes presented above with respect to FIGS. 2a-b, on one hand, and with respect to FIGS. 3a-b, on the other hand, may look very similar and operate using the same principle of search signal injection and compensation, there are some basic variations in the way they induce the search signal in the control arrangement.

The first scheme of modulating K (FIGS. 2a-b) does not inject a direct step disturbance to the scalar control flux reference. The MTPA control block has a definite frequency response, and thus a step variation in K does not cause a step variation in the flux reference. In the second scheme (FIGS. 3a-b), the direct step inputs to the reference d axis current may cause spikes in the feedback current unless some filtering of the reference signals is performed. Therefore, appropriate filtering is advisable.

The control arrangements disclosed herein have been described as a sequence of modules and/or blocks for performing various tasks. These modules and/or blocks are preferably implemented as software executed in a microprocessor, a digital control arrangement, or similar device to control an electric motor.

The present disclosure refers also to control methods for performing, and computer programs for executing, the above disclosed tasks.

It shall be appreciated by a person skilled in the art that the above disclosed embodiments may be combined to form further embodiment falling within the terms of the claims.

What is claimed is:

1. A control system for an electric three-phase variable speed motor having a stator and rotor, the control system comprising an inverter for providing power to the electric motor, a scalar based control arrangement for controlling said inverter, and current sensors configured to repeatedly detect currents of the motor, wherein the control arrangement comprises:
   a d and q axis currents determining module configured to repeatedly determine d and q axis currents based on the detected currents;
   a filter block for repeatedly filtering the determined q axis current, thereby generating a reference q axis current;
   an MTPA (maximum torque per ampere) control block for repeatedly generating a reference d axis current based on said determined d and q axis currents and a ratio value such that the ratio of the d and q axis currents is equal to said ratio value, wherein said ratio value is unity, and
   a switching signal generation module configured to repeatedly generate switching signals to control said inverter based on said reference d and q axis currents characterized in that the control arrangement comprises
   a fine adjustment module which is configured to calculate a magnitude of a current or power of the motor and to determine an optimum compensation ratio value based on the calculated magnitude of a current or power of the motor, which optimum compensation ratio value is added to the ratio value to form an adjusted ratio value, which adjusted ratio value when being used by the MTPA control block would cause the motor to operate in a condition wherein the magnitude of a current or power of the motor is minimized, wherein
   the MTPA control block is configured to repeatedly generate an adjusted reference d axis current based on said determined d and q axis currents and said adjusted ratio value such that the ratio of the d and q axis currents is equal to said adjusted ratio value; and
   the switching signal generation module is configured to repeatedly generate switching signals to control said inverter based on said adjusted reference d axis current.

2. The control system of claim 1 wherein the fine adjustment module is configured to determine the optimum compensation ratio value in an iterative algorithm based on the perturb and observe principle.

3. The control system of claim 1 wherein said fine adjustment module is configured to determine said optimum compensation ratio value by performing the following algorithm:
   (i) switching on and switching off a perturbation signal, which is added to the ratio value, to form a signal on which the MTPA control block is configured to base a repeatedly generated reference d axis current, on which in turn the switching signal generation module is configured to base repeatedly generated switching signals to control said inverter,
   (ii) determining a difference between a magnitude of a current or power of the motor when the perturbation signal is switched on and a magnitude of a current or power of the motor when the perturbation signal is switched off, and
   (iii) accumulatively adding a compensation ratio value to the signal on which the MTPA control block is configured to base a repeatedly generated reference d axis current, wherein the compensation ratio value is determined dependent on said difference, wherein (i)-(iii) are repeated until said difference falls short of a threshold level.

4. The control system of claim 3 wherein said fine adjustment module is configured to switch off the perturbation signal when said difference falls short of a threshold level and said optimum compensation ratio value is obtained as said accumulatively added compensation ratio value.

5. The control system of claim 1 wherein said magnitude of a current or power of the motor is a magnitude of a current of the motor and is calculated as the mean square root of the determined d and q axis currents or from the detected currents.

6. The control system of claim 1 wherein said magnitude of a current or power of the motor is a magnitude of a power of the motor and is calculated based on detected voltages and currents of said motor.

7. The control system of claim 1 wherein the control system is configured to power the stator of an induction motor, and said current sensors are configured to repeatedly detect stator currents of the motor.

8. The control system of claim 1 wherein the fine adjustment module is configured to be operated at saturated motor flux operation conditions.

9. The control system of claim 1 wherein said magnitude of a current or power of the motor is a magnitude of an estimated power of the motor and is calculated based on reference voltages calculated based on said reference d and q axis currents and said determined d and q axis currents or said detected currents.

10. A control system for an electric three-phase variable speed motor having a stator and rotor, the control system comprising an inverter for providing power to the electric motor, a scalar based control arrangement for controlling said inverter, and current sensors configured to repeatedly detect currents of the motor, wherein the control arrangement comprises:
- a d and q axis currents determining module configured to repeatedly determine d and q axis currents based on the detected currents;
- a filter block for repeatedly filtering the determined q axis current, thereby generating a reference q axis current,
- an MTPA control block for repeatedly generating a reference d axis current based on said determined d and q axis currents and a ratio value such that the ratio of the d and q axis currents is equal to said ratio value, wherein said ratio value is unity, and
- a switching signal generation module configured to repeatedly generate switching signals to control said inverter based on said reference d and q axis currents, characterized in that the control arrangement comprises
- a fine adjustment module-p) which is configured to calculate a magnitude of a current or power of the motor and to determine an optimum compensation current, which is added to the reference d axis current to form an adjusted reference d axis current, which when being used by the switching signal generation module would cause the motor to operate in a condition wherein the magnitude of a current or power of the motor is minimized, wherein
- the switching signal generation module is configured to repeatedly generate switching signals to control said inverter based on said adjusted reference d axis current.

11. The control system of claim 10 wherein the fine adjustment module is configured to determine the optimum compensation current in an iterative algorithm based on the perturb and observe principle.

12. The control system of claim 10 wherein said fine adjustment module is configured to determine said optimum compensation current by performing the following algorithm while the output reference d axis current from the MTPA control block is held latched:
(i) switching on and switching off a perturbation current signal, which is added to the reference d axis current, to form a signal on which the switching signal generation module is configured to base repeatedly generated switching signals to control said inverter,
(ii) determining a difference between a magnitude of a current or power of the motor when the perturbation signal is switched on and a magnitude of a current or power of the motor when the perturbation signal is switched off, and
(iii) accumulatively adding a compensation current to the signal on which switching signal generation module is configured to base repeatedly generated switching signals to control said inverter, wherein the compensation current is determined dependent on said difference, wherein (i)-(iii) are repeated until said difference falls short of a threshold level.

13. The control system of claim 12 wherein said fine adjustment module is configured to switch off the perturbation signal when said difference falls short of a threshold level and said optimum compensation current is obtained as said accumulatively added compensation current.

14. A control method for an electric three-phase variable speed motor having a stator and rotor comprising the steps of:
receiving repeatedly detected currents of the motor;
repeatedly determining d and q axis currents based on the received currents;
repeatedly filtering the determined q axis current, thereby generating a reference q axis current;
applying an MTPA control scheme in which a reference d axis currents is repeatedly generated based on said determined d and q axis currents and a ratio value such that the ratio of the d and q axis currents is equal to said ratio value, wherein said ratio value is unity, and
repeatedly generating switching signals to control an inverter based on said reference d and q axis currents wherein the inverter is operable to power said motor, characterized by the steps of:
fine adjusting the MTPA control scheme by of calculating a magnitude of a current or power of the motor and determining an optimum compensation ratio value based on said calculated magnitude of a current or power of the motor, which optimum compensation ratio value is added to the ratio value to form an adjusted ratio value, which when being used in the MTPA control scheme would cause the motor to operate in a condition wherein the magnitude of a current or power of the motor is minimized;
applying the MTPA control scheme for repeatedly generating an adjusted reference d axis current based on said determined d and q axis currents and said adjusted ratio value such that the ratio of the reference d and q axis currents is equal to said adjusted ratio value; and
repeatedly generating switching signals to control said inverter based on said adjusted reference d axis current.

15. The method of claim 14 wherein the fine adjusting is made by performing the following steps:
(i) switching on and switching off a perturbation signal, which is added to the ratio value, to form a signal on which the MTPA control scheme is configured to base a repeatedly generated reference d axis current, on which in turn the repeatedly generated switching signals to control said inverter are based,
(ii) determining a difference between a magnitude of a current or power of the motor when the perturbation signal is switched on and a magnitude of a current or power of the motor when the perturbation signal is switched off, and
(iii) accumulatively adding a compensation ratio value to the signal on which the MTPA control scheme is configured to base a repeatedly generated reference d axis current, wherein the compensation ratio value is determined dependent on said difference, and wherein steps (i)-(iii) are repeated until said difference falls short of a threshold level, thereby obtaining the optimum compensation ratio value as the accumulatively added compensation ratio value.

16. The method of claim 14 wherein said magnitude of a current or power of the motor is (i) a magnitude of a current of the motor and is calculated as the mean square root of the determined d and q axis currents or from the detected currents; (ii) a magnitude of an estimated power of the motor and is calculated based on (a) reference voltages calculated based on said reference d and q axis currents and (b) said determined d and q axis currents or said detected currents; or (iii) a magnitude of a power of the motor and is calculated based on detected voltages and currents of said motor.

17. The method of claim 14 wherein the fine adjusting is reset when a changed operating condition of the motor, is detected, and the fine adjusting is performed again when a steady state of the motor has been detected.

18. A control method for an electric three-phase variable speed motor having a stator and rotor comprising the steps of:
receiving repeatedly detected currents of the motor;
repeatedly determining d and q axis currents based on the detected currents;

repeatedly filtering the determined q axis current, thereby generating a reference q axis current;

applying an MTPA control scheme in which a reference d axis current is repeatedly generated based on said determined d and q axis currents and a ratio value such that the ratio of the reference d and q axis currents is equal to said ratio value, wherein said ratio value is unity, and repeatedly generating switching signals to control an inverter based on said reference d and q axis currents wherein the inverter is operable to power said motor, characterized by the steps of;

fine adjusting the MTPA control scheme by calculating a magnitude of a current or power of the motor and determining an optimum compensation current based on said calculated magnitude of a current or power of the motor, which optimum compensation current is added to the reference d axis current to form an adjusted reference d axis current, which when being used for generating the switching signals would cause the motor to operate in a condition wherein the magnitude of a current or power of the motor is minimized; and repeatedly generating switching signals to control said inverter based on said adjusted reference d axis current.

19. The method of claim 18 wherein the fine adjusting is made by performing the following steps while the output reference d axis current from the MTPA control block is held latched:

(i) switching on and switching off a perturbation current signal, which is added to the reference d axis current, to form a signal on which the repeatedly generated switching signals to control said inverter are based, (ii) determining a difference between a magnitude of a current or power of the motor when the perturbation signal is switched on and a magnitude of a current or power of the motor when the perturbation signal is switched off, and (iii) accumulatively adding a compensation current to the signal on which the repeatedly generated switching signals to control said inverter are based, wherein the compensation current is determined dependent on said difference, and wherein steps (i)-(iii) are repeated until said difference falls short of a threshold level.

\* \* \* \* \*